(12) United States Patent  
Liu et al.

(10) Patent No.: US 9,357,173 B2  
(45) Date of Patent: *May 31, 2016

(54) METHOD AND TERMINAL FOR TRANSMITTING INFORMATION

(71) Applicant: Huawei Technologies Co., Ltd., Shenzhen (CN)

(72) Inventors: Yuan Liu, Shenzhen (CN); Xianyi Chen, Shenzhen (CN); Jing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,131

(22) Filed: Jul. 20, 2015

(65) Prior Publication Data

US 2015/0326826 A1 Nov. 12, 2015

Related U.S. Application Data

(60) Division of application No. 14/198,232, filed on Mar. 5, 2014, now Pat. No. 9,088,696, which is a continuation of application No. PCT/CN2012/083962, filed on Nov. 2, 2012.

(30) Foreign Application Priority Data

Nov. 8, 2011 (CN) .......................... 2011 1 0350359

(51) Int. Cl.
  *H04N 7/15* (2006.01)
  *H04N 7/14* (2006.01)
(52) U.S. Cl.
  CPC .............. *H04N 7/152* (2013.01); *H04N 7/142* (2013.01); *H04N 7/147* (2013.01)

(58) Field of Classification Search
  None
  See application file for complete search history.

(56) References Cited

U.S. PATENT DOCUMENTS

2007/0250567 A1 10/2007 Graham et al.
2009/0225152 A1 9/2009 Saleh et al.
(Continued)

FOREIGN PATENT DOCUMENTS

CN 101467448 A 6/2009
CN 101874405 A 10/2010
(Continued)

OTHER PUBLICATIONS

"Key Factors to Provide an Immersive Telepresence Experience," Rapporteur Meeting Document, AVD-4013, Polycom Inc., Research Triangle Park, North Carolina, International Telecommunication Union (Nov. 29-Dec. 3, 2010).
(Continued)

*Primary Examiner* — Creighton Smith
(74) *Attorney, Agent, or Firm* — Leydig, Voit & Mayer, Ltd.

(57) ABSTRACT

The present invention discloses a method and a terminal for transmitting information. The method includes: obtaining, by a second video conference system, an image adjustment parameter from a first video conference system; adjusting, by the second video conference system, a received or captured image according to the image adjustment parameter. According to the method and the terminal for transmitting information in embodiments of the present invention, an image adjustment parameter indicating shooting width information in a form of spatial information is sent to a second system, so that the second system can adjust an image according to the image adjustment parameter, thereby effectively obtaining and transmitting information used for image adjustment, improving user experience, and enhancing product competitiveness.

20 Claims, 7 Drawing Sheets

(56) References Cited

U.S. PATENT DOCUMENTS

| | | | | |
|---|---|---|---|---|
| 2010/0002197 A1* | 1/2010 | Kaneko | ................ | G03B 21/00 353/31 |
| 2012/0169833 A1 | 7/2012 | Wu et al. | | |
| 2013/0113876 A1 | 5/2013 | Zhao et al. | | |
| 2013/0242036 A1 | 9/2013 | Gorzynski et al. | | |
| 2014/0126025 A1* | 5/2014 | Kuwata | ................ | G06F 3/1208 358/3.27 |
| 2014/0375675 A1* | 12/2014 | Ishihara | ................ | G09G 5/003 345/601 |
| 2015/0287387 A1* | 10/2015 | Ma | .................... | G09G 5/10 345/173 |

FOREIGN PATENT DOCUMENTS

| | | |
|---|---|---|
| CN | 102025891 A | 4/2011 |
| CN | 102037726 A | 4/2011 |
| EP | 2472859 A1 | 7/2012 |
| EP | 2525574 A1 | 11/2012 |
| WO | WO 2009117005 A1 | 9/2009 |
| WO | WO 2011091604 A1 | 8/2011 |

OTHER PUBLICATIONS

"Proposed Work Programme for Q5/16," TD 532 (WP 2/16), Geneva, Switzerland, International Telecommunication Union (Mar. 14-25, 2011).

"Series H: Audiovisual and Multimedia Systems; Infrastructure of audiovisual services—Communication procedures; Implementors Guide for Recommendations of the H.320 System ("Narrow-band visual telephone systems and terminal equipment"): H.320, H.221, H.224, H.230, H.242, H.243," ITU-T H.320 System Implementors' Guide, International Telecommunication Union, Geneva, Switzerland (Nov. 26, 2004).

"Series H: Audiovisual and Multimedia Systems; Infrastructure of audiovisual services—Communication procedures; Implementors' Guide for Recommendations of the H.323 System (Packet-based multimedia communications systems):H.323, H.225.0, H.245, H.246, H.283, H.341,H.450 Series, H.460 Series, and H.500 Series," ITU-T H.323 System Implementors' Guide, International Telecommunication Union, Geneva, Switzerland (Nov. 6, 2009).

Notice of Allowance in U.S. Appl. No. 14/198,232 (May 4, 2015).

\* cited by examiner

# METHOD AND TERMINAL FOR TRANSMITTING INFORMATION

CROSS-REFERENCE TO RELATED APPLICATIONS

This application is a divisional application of U.S. patent application Ser. No. 14/198,232, filed on Mar. 5, 2014, which is a continuation of International Patent Application No. PCT/CN2012/083962, filed on Nov. 2, 2012. The International Patent Application claims priority to Chinese Patent Application No. 201110350359.8, filed on Nov. 8, 2011. The aforementioned patent applications are hereby incorporated by reference in their entireties.

TECHNICAL FIELD

The present invention relates to the field of video conferencing, and in particular, to a method and a terminal for transmitting information in the field of video conferencing.

BACKGROUND

In the 1980s, with the development of encoding and information compression technologies and with the rapid development of a digital network, a video conference system starts to enter the market. A first set of international standards about the video conference system, that is, H.320, is not approved until the early 1990s, and therefore, a problem of compatibility between products of different brands is solved, and a video conference system based on a traditional telecommunication network, such as an integrated services digital network (Integrated Services Digital Network, "ISDN" for short) becomes a mainstream of a market of video conference products. In the middle and late 1990s, an Internet protocol (Internet Protocol, "IP" for short) network technology becomes mature. An IP network develops into an important network platform for global communication. In 1998, the International Telecommunication Union Telecommunication Standardization Sector (ITU-T) announces H.323 video conference standards based on the IP network, making research and application directions of the video conference system turn to development based on the IP network.

Therefore, the video conference system, especially a video conference system based on the H.323 video conference standards, is applied more and more extensively with the rapid development of the IP network. Sectors such as governments, armies, and enterprises generally deploy their own video conference systems, so as to improve conference efficiency, and lower conference costs.

In recent years, a telepresence technology is put forward in a video conference market, and becomes a hotspot in the market rapidly. With the telepresence technology, you walk into an ordinary conference room, sit on a chair, and talk cheerfully and humorously with participants next to you. If you are not told that the participants next to you are thousands of miles away, you are hardly aware of that. The participants next to you are at another end of a network, but their images are displayed on a display device of the conference room in a format of a size of a real person. Each action and expression are captured and fully revealed, and you do not feel uncomfortable and abnormal at all. A video image in the size of a real person, an ultra high definition image effect, a perfect combination of an audio system with a sense of space and the environment create an atmosphere that you are in one conference room with a person you are talking to who is far away.

A set of complete telepresence system generally needs to be formed by a proper conference room, a power supply and a network channel with a high bandwidth, an independent wall, a table, chairs, lighting, a video display device, a control device, and an audio device. Compared with a traditional conference system, the telepresence system has its own unique advantages. Besides saving travel expenses, conference quality is greatly improved, and telepresence overcomes a plane and unauthentic effect of a traditional video conference, to make a conference more natural and improve the conference efficiency.

With upgrading of the display device of the telepresence system, both a screen size and a border size of the display device change. Using a new display device with a narrow border to perform image stitching better facilitates enhancing of user experience. In addition, an overlapping area between two cameras may be removed by using an algorithm, which makes images output by the two cameras more consistent. However, the prior art brings forward a problem of how to perform image adjustment in a case where a user updates a device, to obtain an optimal display effect, but does not involve how to obtain and transmit information used for the image adjustment.

SUMMARY

In multiple aspects of the present invention, a method and a terminal for transmitting information are provided, which can effectively obtain and transmit information used for image adjustment.

In one aspect of the present invention, a method for transmitting information is provided, where the method includes: determining shooting width information of a first system; determining an image adjustment parameter according to the shooting width information, where the image adjustment parameter is used to indicate the shooting width information in a form of spatial information; sending the image adjustment parameter to a second system, so that the second system adjusts a received or captured image according to the image adjustment parameter.

In another aspect of the present invention, a method for transmitting information is provided, where the method includes: obtaining an image adjustment parameter sent by a first system, where the image adjustment parameter is used to indicate shooting width information of the first system in a form of spatial information; and adjusting a received or captured image according to the image adjustment parameter.

In another aspect of the present invention, a terminal for transmitting information is provided, where the terminal includes: a first determining module, configured to determine shooting width information of a first system including the terminal; a second determining module, configured to determine an image adjustment parameter according to the shooting width information determined by the first determining module, where the image adjustment parameter is used to indicate the shooting width information in a form of spatial information; and a sending module, configured to send, to a second system, the image adjustment parameter determined by the second determining module, so that the second system adjusts a received or captured image according to the image adjustment parameter.

In another aspect of the present invention, a terminal for transmitting information is provided, where the terminal includes: an obtaining module, configured to obtain an image adjustment parameter sent by a first system, where the image adjustment parameter is used to indicate shooting width information of the first system in a form of spatial information; and an adjusting module, configured to adjust a received or captured image according to the image adjustment parameter obtained by the obtaining module.

Based on the foregoing technical solutions, according to the method and the terminal for transmitting information in the embodiments of the present invention, an image adjustment parameter indicating shooting width information in a form of spatial information is sent to a second system, so that the second system can adjust an image according to the image adjustment parameter, thereby effectively obtaining and transmitting information used for image adjustment, improving user experience, and enhancing product competitiveness.

BRIEF DESCRIPTION OF DRAWINGS

To describe the technical solutions according to the embodiments of the present invention more clearly, accompanying drawings for describing the embodiments of the present invention are introduced briefly in the following. Apparently, the accompanying drawings in the following description are only some embodiments of the present invention, and a person of ordinary skill in the art may further derive other drawings according to these accompanying drawings without creative efforts.

DESCRIPTION OF EMBODIMENTS

The technical solutions according to the embodiments of the present invention are clearly described in the following with reference to the accompanying drawings in the embodiments of the present invention. Obviously, the embodiments to be described are only a part of rather than all of the embodiments of the present invention. All other embodiments obtained by a person of ordinary skill in the art based on the embodiments of the present invention without creative efforts shall fall within the protection scope of the present invention.

It should be understood that, the technical solutions according to the embodiments of the present invention may be applied to various video conference systems, especially a telepresence (telepresence) system.

Figure 1:
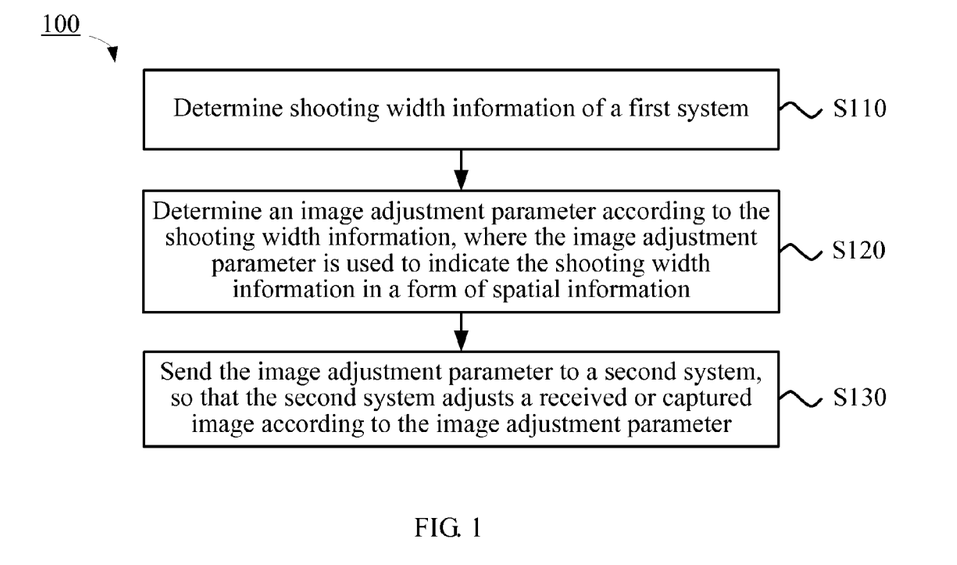
FIG. 1 is a schematic flowchart of a method for transmitting information according to an embodiment of the present invention.

FIG. 1 is a schematic flowchart of a method 100 for transmitting information according to an embodiment of the present invention. As shown in FIG. 1, the method 100 includes:

S110: Determine shooting width information of a first system.

S120: Determine an image adjustment parameter according to the shooting width information, where the image adjustment parameter is used to indicate the shooting width information in a form of spatial information.

S130: Send the image adjustment parameter to a second system, so that the second system adjusts a received or captured image according to the image adjustment parameter.

To effectively obtain and transmit information for image adjustment, the first system may determine, according to the determined shooting width information of the first system, the image adjustment parameter used to indicate the shooting width information in the form of the spatial information, and may send the image adjustment parameter to the second system, so that the second system may adjust the received or captured image according to the image adjustment parameter.

Therefore, according to the method for transmitting information in the embodiment of the present invention, an image adjustment parameter indicating shooting width information in a form of spatial information is sent to a second system, so that the second system can adjust an image according to the image adjustment parameter, thereby effectively obtaining and transmitting information used for image adjustment, improving user experience, and enhancing product competitiveness.

It should be understood that, in the embodiment of the present invention, the first system or the second system may be a video conference system, or other systems communicating with each other, for example, the first system or the second system is a multipoint control unit. The embodiment of the present invention is described by using an example that the first system and the second system are telepresence systems, but the embodiment of the present invention is not limited thereto, and the first system or the second system may be other video conference systems besides the telepresence system.

It should be further understood that, a telepresence technology, as a new technology, is widely applied in various video conferences. The technology may provide an image in a size of a real person, an ultra high definition resolution, stereoscopic audio and a specially designed environment, which can therefore create a sensation of a "room-in-room" video conference. A telepresence video conference may provide a user with immersive, face-to-face conference experience, making the user feel that participants seem to be in a same room, which may therefore solve problems in a traditional video conference that communication is not authentic enough, sizes of persons are not consistent, images are fuzzy, and images and voices are not synchronized.

In the telepresence video conference, each camera in a local conference site corresponds to a different user area, and each camera simultaneously picks up an image of a corresponding user area, and sends the image to a conference terminal in a remote conference site. The conference terminal in the remote conference site stitches, by adopting a physical or digital image stitching technology, images picked up by cameras in the local conference site, and then transmits the stitched images to a display device in the remote conference site for displaying. Meanwhile, a conference terminal in the local conference site may also adopt the physical or digital image stitching technology to stitch images picked up by cameras in the remote conference site, and then transmit the stitched images to a display device in the local conference site for displaying. It should be further understood that, to make the image stitching coherent, the local conference site or the remote conference site generally selects a display device of a fixed model, and at least border widths of display devices are the same.

In S110, the first system may adopt various methods to determine the shooting width information of the first system. Optionally, the shooting width information includes first width information of adjacent shooting areas of the first system, or second width information of a blind area between the adjacent shooting areas.

In the embodiment of the present invention, the first system may determine the second width information according to a border width of a display device, and may also determine the second width information according to a horizontal distance between adjacent images, and the first system may further determine the second width information according to information which is of the first system and is related to a shooting area, which are respectively described in the following with reference to FIG. 2A to FIG. 2D.

Figure 2A:
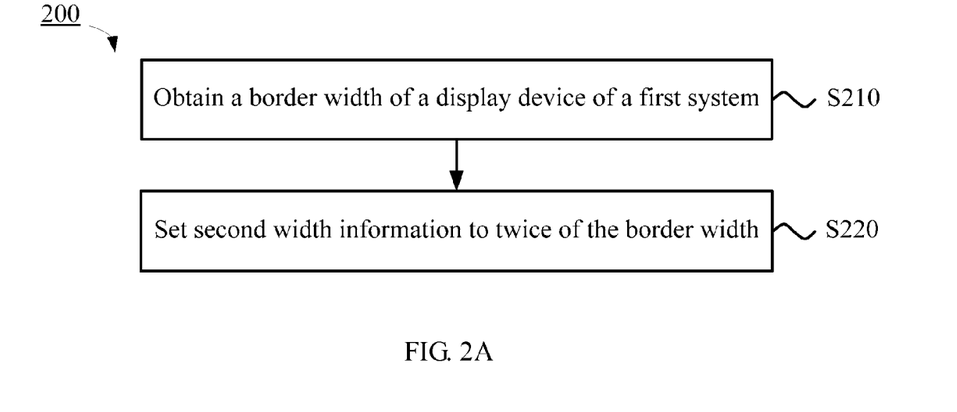
FIG. 2A to FIG. 2D are another schematic flowchart of a method for transmitting information according to an embodiment of the present invention.

FIG. 2A is a schematic flowchart of a method 200 for determining shooting width information according to an embodiment of the present invention. As shown in FIG. 2, the method 200 includes:

S210: A first system obtains a border width of a display device of the first system.

S220: The first system sets second width information to twice of the border width.

In the embodiment of the present invention, to make an image displayed in a remote conference site consistent with an image shot in a local conference site to provide a more authentic effect, a blind area between adjacent shooting areas of the first system or a second system is set to match a border of a display device. Specifically, a width of the blind area is set to twice of the width of the border of the display device.

Figure 3:
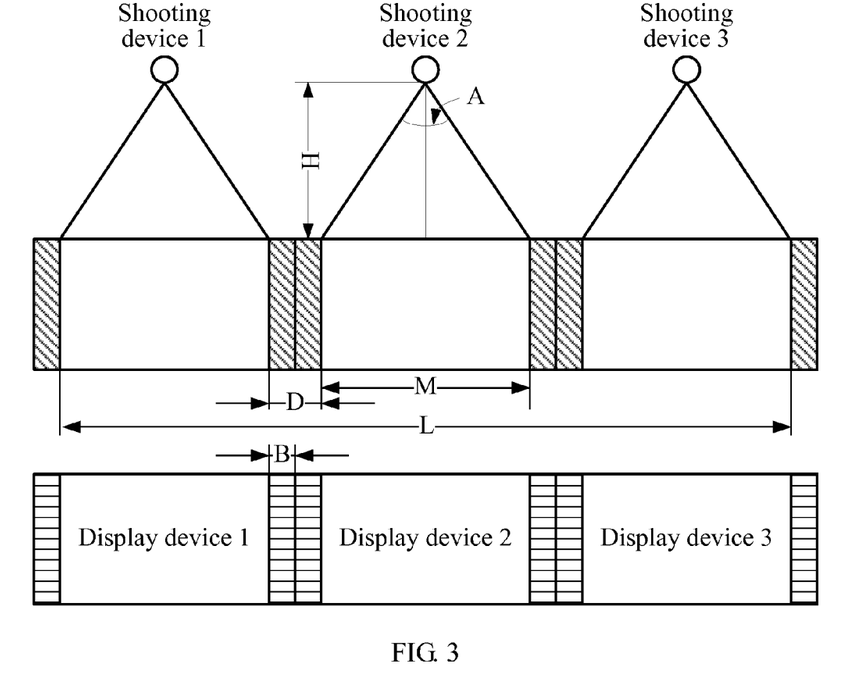
FIG. 3 is a schematic block diagram of a telepresence system according to an embodiment of the present invention.

As shown in FIG. 3, M is a width of a single shooting area of the first system, L is a total width of shooting areas of the first system, D is a width of a blind area between two adjacent shooting areas of the first system, and B is the width of the border of the display device. Therefore, the first system may set the second width information D to twice of the border width B of the display device of the first system, that is, D=2B.

In the embodiment of the present invention, the display device has borders, which incurs discontinuity of displayed content, so that, to match the display device, a part of blind areas need to be reserved between shooting areas of shooting devices, and therefore, shot images of a whole conference site are consistent with displayed images of a whole local conference site. Generally, a shot image displayed by a local display device may be used as a reference. Therefore, a distance between images locally displayed may also reflect the width of the blind area.

Figure 2B:
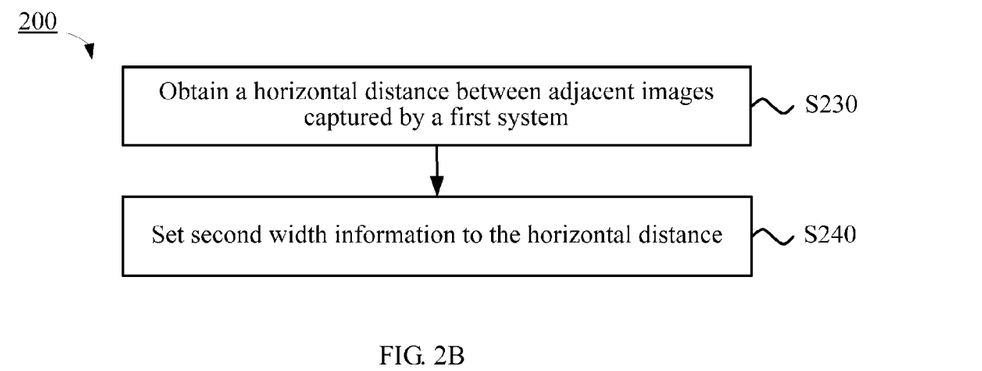

Therefore, as shown in FIG. 2B, the method 200 for determining shooting width information according to the embodiment of the present invention may include:

S230: A first system obtains a horizontal distance between adjacent images captured by the first system.

S240: The first system sets second width information to the horizontal distance.

As shown in FIG. 3, the first system may determine the second width information D as the horizontal distance between the adjacent images captured by the first system, that is, a width of a blind area is set to the horizontal distance between the adjacent images captured by the first system.

Figure 2C:
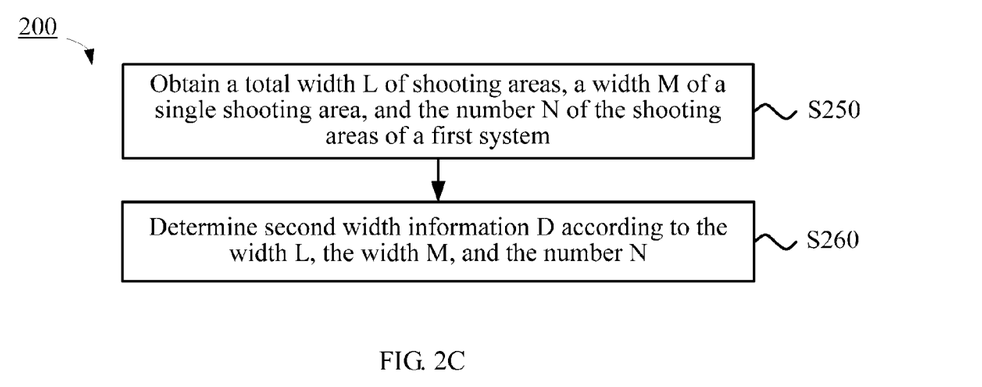

In the embodiment of the present invention, optionally, the method 200 for determining shooting width information according to the embodiment of the present invention may also include:

S205: A first system obtains a total width L of shooting areas, a width M of a single shooting area, and the number N of the shooting areas of the first system.

S260: The first system determines second width information D according to the width L, the width M, and the number N, where the second width information D is determined according to the following equation: $D=(L-M \cdot N)/(N-1)$.

Specifically, as shown in FIG. 3, the first system includes, for example, three shooting devices, that is, a value of the number N of the shooting areas is 3, and therefore, the second width information D may be expressed as: $D=(L-3M)/2$.

Figure 2D:
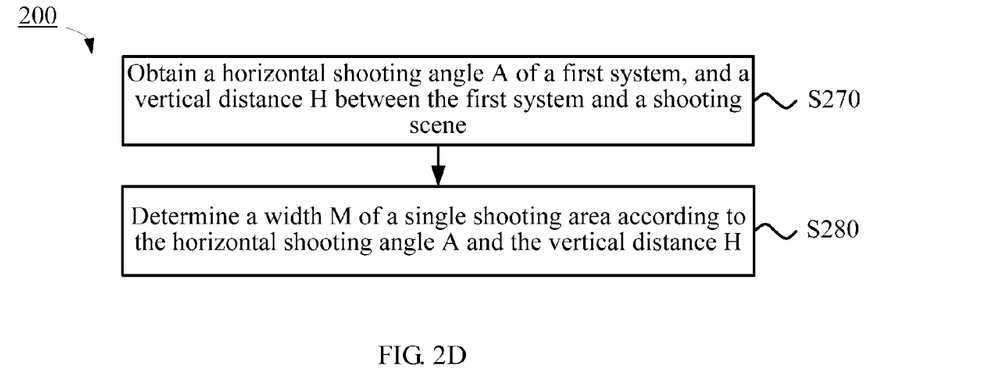

In the embodiment of the present invention, the width of the single shooting area may be directly obtained through measurement, and may also be obtained according to a method shown in FIG. 2D. That is, the width M of the single shooting area may be determined according to a horizontal shooting angle A of the first system, and a vertical distance H between the first system and a shooting scene. In this case, as shown in FIG. 2D, the method 200 may further include:

S270: A first system obtains a horizontal shooting angle A of the first system, and a vertical distance H between the first system and a shooting scene.

S280: The first system determines a width M of a single shooting area according to the horizontal shooting angle A and the vertical distance H, where the width M of the single shooting area is determined according to the following equation: $M=2 \tan(A/2) \cdot H$.

It should be understood that, in the embodiment of the present invention, the second width information and the first width information which are determined by the first system are correlated with each other, and therefore, the second width information may be determined according to the first width information. For example, as shown in FIG. 3, if the first system obtains width information of shooting areas of adjacent shooting devices 1 and 2, that is, the first system obtains the first width information, the first system may determine, according to an ending position of a first shooting area of the shooting device 1 and a starting position of a second shooting area of the shooting device 2, a width of a blind area between the first shooting area and the second shooting area that are adjacent to each other, that is, determine the second width information according to the first width information.

In S120, the first system may determine an image adjustment parameter according to the shooting width information, where the image adjustment parameter is used to indicate the shooting width information in a form of spatial information.

Optionally, in the embodiment of the present invention, the first system determines the image adjustment parameter according to the shooting width information and location information of the first system, where the image adjustment parameter includes first spatial information of adjacent shooting areas of the first system, or second spatial information of a blind area between the adjacent shooting areas.

It should be understood that, the location information of the first system may include location information of the display device of the first system, may also include location information of a shooting device of the first system, and may further include location information of an artificially set reference point of the first system, but the embodiment of the present invention is not limited thereto.

For example, the width of the blind area, that is, the second width information, is 10 millimeters, and the blind area is located 2000 millimeters right to an origin horizontally, so that it may be obtained that spatial information of the blind area is 2000 millimeters to 2010 millimeters right to the origin horizontally. For another example, a size of the blind area is 1% of the whole conference site, and is located at ⅓ of the whole conference site, so that it can be obtained that the blind area accounts for a width of 1% between 32% and 33% of the conference site. Meanwhile, it should be understood that, information of the blind area and information of the shooting area are complementary to each other, the information of the shooting area is very easy to be obtained according to the information of the blind area, and on the contrary, the information of the blind area is also very easy to be obtained according to the information of the shooting area.

In the embodiment of the present invention, the image adjustment parameter determined by the first system according to the shooting width information and the location information of the first system may be used to indicate the size and a location of the blind area, and may also used to indicate sizes of the shooting areas of the first system and a spatial relationship between the shooting areas, and the two may be converted into each other. The image adjustment parameter may be a logical parameter, and may also be a physical parameter. Moreover, it should be understood that, the parameter is only transmitted between conference sites that communicate, and may not be transmitted between conference sites that do not communicate.

Specifically, if the logical parameter is used to express the image adjustment parameter, the image adjustment parameter may be a proportion of each shooting area of the first system to the whole conference site. For example, a range of the whole conference site is defined as [0, 99], and shooting areas of three cameras are respectively expressed as [0, 33], [33, 66], and [66, 99], so as to indicate that the three cameras each occupy ⅓ of the whole conference site. It should be understood that, a range in a horizontal direction is used as an example herein, and it is assumed that ranges in a vertical direction are the same; situations of other directions may be processed similarly, and are not described in detail herein. Similarly, the image adjustment parameter expressed by using the logical parameter may also be a proportion of each blind area of the first system to the whole conference site. For example, [32, 33] indicates a blind area whose size is 1% of the whole conference site.

It should be understood that the first spatial information and the second spatial information may be converted into each other. Using the first spatial information indicating the shooting area as an example, if shooting areas of two adjacent cameras are discontinuous, it is indicated that a blind area appears. For example, if two shooting areas are respectively [0, 32] and [33, 66], it indicates that there is a blind area between the two shooting devices, and a size of the blind area is 1% of the whole conference site. Similarly, information of the shooting area may be derived according to the size and relevant information of the blind area.

If a physical parameter is used to express the image adjustment parameter, the image adjustment parameter may indicate the first spatial information by using a length unit, and for example, a default unit is millimeter. For example, an x axis indicates a horizontal shooting range, a y axis indicates a vertical shooting range, a z axis indicates a depth, and coordinates of a shooting device is [1500, 500, 0]. x=[1000, 2000] indicates that the horizontal shooting range of the camera is 1000 millimeters to 2000 millimeters. y=[0, 1000] indicates that the vertical shooting range of the camera is 0 millimeter to 1000 millimeters. Because a distance between the shooting device and the shooting area, that is, the depth z of the shooting area, is fixed, that is, does not affect the shooting area, a definition of the dimension may be omitted, and is not indicated in the parameter. In this case, one origin may be further set for the whole conference site, and certainly, the origin may also not be set. As a reference point of the whole shooting area, values of the shooting ranges and the shooting areas are all obtained relative to the origin, for example, the coordinates of the shooting device are [1500, 500, 0], indicating that the camera is located 1500 millimeters right to the origin horizontally, 500 millimeters above the origin vertically, and at a same depth as the origin. Similarly, the second spatial information may also be indicated by using the length unit. For example, x=[2000, 2010] indicates that the width of the blind area is 10 millimeters, and the blind area is located 2000 millimeters right to the origin horizontally. Similarly, the first spatial information and the second spatial information may be converted into each other.

Certainly, the first spatial information or the second spatial information may also be indicated by using an angle unit, and default units may be degree and meter. For example, a represents a horizontal angle range, b represents a vertical angle range, and h represents a depth. For example, the coordinates of the camera are [1500, 500, 0]. a=[−15, 15] indicates that the horizontal shooting angle of the camera is −15 degrees to 15 degrees. b=[0, 30] indicates that a vertical shooting angle of the camera is 0 degree to 30 degrees. Because a distance between the camera and the shooting area is fixed, the depth of the shooting area may be omitted. It should be understood that, the embodiment of the present invention is described by using an example that the first spatial information or the second spatial information is indicated only through the length unit or the angle unit, but the embodiment of the present invention is not limited thereto, and the first spatial information or the second spatial information may also be expressed by using other physical parameters.

In S130, the first system sends the image adjustment parameter to the second system, so that the second system adjusts a received or captured image according to the image adjustment parameter.

Figure 4:
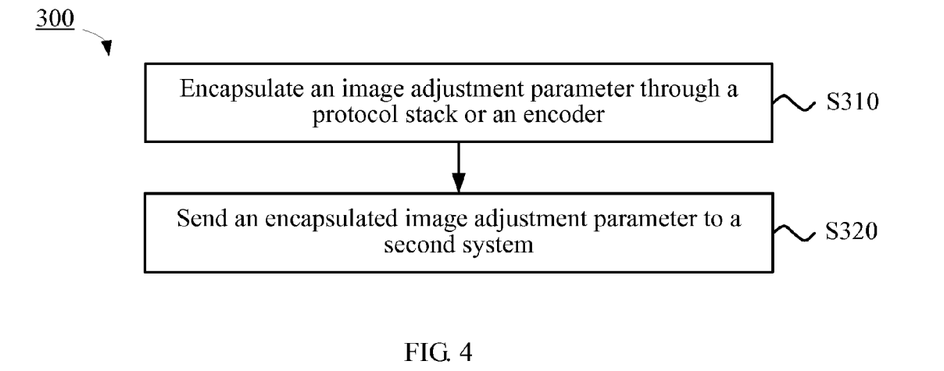
FIG. 4 is still another schematic flowchart of a method for transmitting information according to an embodiment of the present invention.

Optionally, in the embodiment of the present invention, as shown in FIG. 4, a method 300 for sending an image adjustment parameter to a second system may include:

S310: A first system encapsulates the image adjustment parameter through a protocol stack or an encoder.

S320: The first system sends the encapsulated image adjustment parameter to the second system.

Optionally, when the first system encapsulates the image adjustment parameter through the protocol stack, the first system may describe the image adjustment parameter by using a session description protocol (Session Description Protocol, "SDP" for short), and the first system may also encapsulate the parameter in a specific packet of other protocols. For example, as a part of capability exchange, the first system adds descriptions of the image adjustment parameter in a video capability (VideoCapability) field in a terminal capability set (terminalCapabilitySet) message; or, when a media channel is opened, the first system adds descriptions of the image adjustment parameter in a data type (DataType type:videoData) field of an open logical channel (openLogicalChannel) message; or, when a call is set up, the image adjustment parameter is transmitted in call signaling, for example, is carried in a feature set (FeatureSet) structure in an ARQ or a setup (Setup) message in the call signaling or is carried in a generic data (GenericData) field in the call signaling, for example, serving as a desiredFeature/neededFeature/supportedFeature; or, in a session initiation protocol (Session Initiation Protocol, "SIP" for short) protocol message body, the parameter is described by using a structured language, for example, an extensible markup language (Extensible Markup Language, "XML" for short) language.

Description is given in the following by using an example that the image adjustment parameter is encapsulated in an SDP packet.

In the SDP protocol, a line indicating the parameter may be customized, for example, it is defined in an attribute line that a=region indicates a capturing area, and a=gapregion indicates a blind area; a=region:0,33 may represent a capturing area [0, 33] of a camera in the first embodiment, that is, if a capturing area is [a, b], the capturing area is expressed as a=region:a,b, where a and b are numbers. a=gapregion:32,33 may represent the blind area [32, 33] in the first embodiment, that is, if a blind area is [c, d], the blind area is expressed as a=gapregion:c,d, where c and d are numbers. For example, it may also be defined that a=coordinate indicates a location of a shooting device, and is used in combination with a=region or a=gapregion, for example, coordinates of the shooting device are [1500, 500, 0], and may be expressed as a=coordinate:1500,500,0; a=xregion:1000,2000, and a=yregion:0,1000, which may be used to indicate information x=[1000, 2000] and y=[0, 1000] of a horizontal shooting area in the foregoing embodiment. And, a=gapregion:2000,2010 may be used to indicate information x=[2000, 2010] of the blind area in the foregoing embodiment.

The first system may also encapsulate the image adjustment parameter through the encoder. For example, the first system may perform custom encapsulation on the parameter in a real-time transport protocol (Real-time Transport Protocol, "RTP" for short) packet by using an H.264 supplemental enhancement information (Supplemental Enhancement Information, "SEI" for short) format. For example, a custom value is selected in a SEI payload type (Payload Type, "PT" for short), such as 211, and payload data (Payload Data) is filled with specific information of the parameter.

It should be understood that, in each embodiment of the present invention, values of serial numbers of the foregoing procedures do not mean an execution sequence. The execution sequence of the procedures should be determined according to functions and internal logic of the procedures, and should not form any limitation to the implementation procedures of the embodiment of the present invention.

Therefore, according to the method for transmitting information in the embodiment of the present invention, an image adjustment parameter indicating shooting width information in a form of spatial information is sent to a second system, so that the second system can adjust an image according to the image adjustment parameter, thereby effectively obtaining and transmitting information used for image adjustment, improving user experience, and enhancing product competitiveness.

In the foregoing, with reference to FIG. 1 to FIG. 4, the method for transmitting information according to the embodiments of the present invention is described in detail from a perspective of a party sending an image adjustment parameter. In the following, with reference to FIG. 5 and FIG. 6, a method for transmitting information according to an embodiment of the present invention is described from a perspective of a party receiving an image adjustment parameter.

Figure 5:
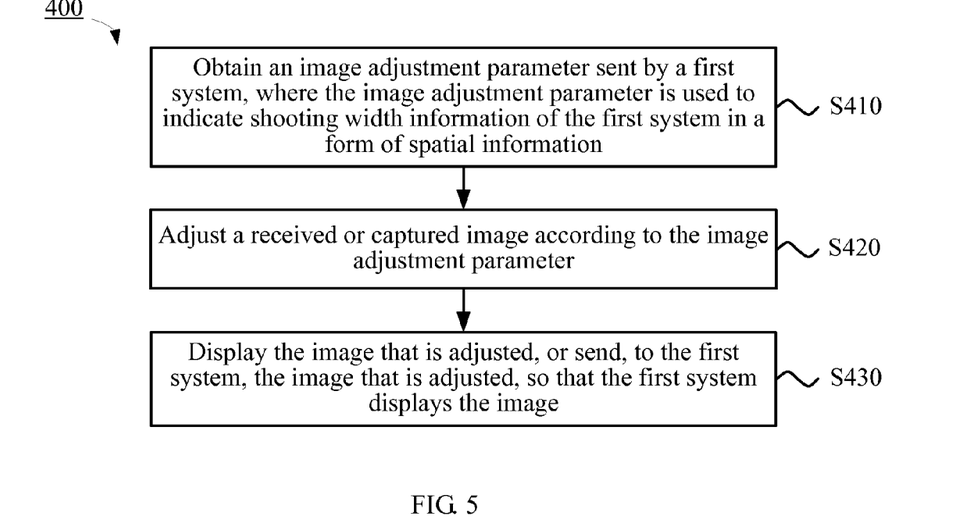
FIG. 5 is a schematic flowchart of a method for transmitting information according to another embodiment of the present invention.

As shown in FIG. 5, a method 400 for transmitting information according to an embodiment of the present invention may include:

S410: Obtain an image adjustment parameter sent by a first system, where the image adjustment parameter is used to indicate shooting width information of the first system in a form of spatial information.

S420: Adjust a received or captured image according to the image adjustment parameter.

A second system may obtain the image adjustment parameter sent by the first system, and may adjust the received or captured image according to the image adjustment parameter, where the image adjustment parameter is used to indicate the shooting width information of the first system in the form of the spatial information.

Therefore, according to the method for transmitting information in the embodiment of the present invention, an image adjustment parameter which is sent by a first system and indicates shooting width information in a form of spatial information is obtained, so that a second system can adjust an image according to the image adjustment parameter, thereby effectively obtaining and transmitting information used for image adjustment, improving user experience, and enhancing product competitiveness.

It should be understood that, in the embodiment of the present invention, description is given by using an example that the first system is used to indicate a body that sends the image adjustment parameter, and the second system is used to indicate a body that receives the image adjustment parameter, but the embodiment of the present invention is not limited thereto. For example, the first system may also receive the image adjustment parameter, and similarly, the second system may also send the image adjustment parameter. It should be further understood that, the first system or the second system may include one or more video conference systems.

In the embodiment of the present invention, optionally, as shown in FIG. 5, the method 400 may further include:

S430: The second system displays the image that is adjusted; or the second system sends, to the first system, the image that is adjusted, so that the first system displays the image.

Specifically, in the embodiment of the present invention, the first system may determine the shooting width information of the first system, determine the image adjustment parameter according to the shooting width information, and send the image adjustment parameter to the second system. The second system may receive the image adjustment parameter, and adjust, according to the image adjustment parameter, an image sent by the first system, and the second system displays the image that is adjusted; or, the second system may also receive the image adjustment parameter, adjust, according to the image adjustment parameter, an image captured by the second system, and send, to the first system, the image that is adjusted, so that the first system displays the image.

Therefore, when a processing capability of one system of the first system and the second system is relatively poor, the other system may process the image, so as to balance processing capabilities of the systems, thereby improving processing efficiency of the system, and improving user experience on the whole.

Optionally, in the embodiment of the present invention, the image adjustment parameter includes first spatial information of adjacent shooting areas of the first system, or second spatial information of a blind area between the adjacent shooting areas. It should be understood that, similarly, the first spatial information and the second spatial information may be converted into each other, which, for simplicity, is not repeatedly described herein.

Figure 6:
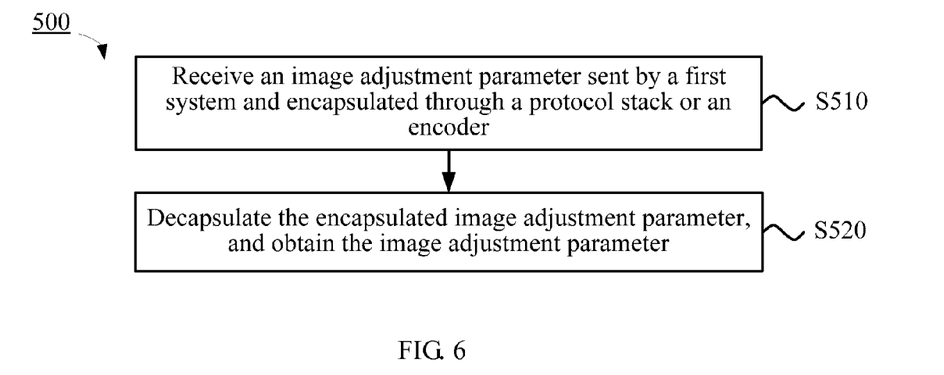
FIG. 6 is another schematic flowchart of a method for transmitting information according to another embodiment of the present invention.

As shown in FIG. 6, a method 500 for obtaining an image adjustment parameter sent by a first system according to an embodiment of the present invention may include:

S510: A second system receives the image adjustment parameter sent by the first system and encapsulated through a protocol stack or an encoder.

S520: The second system decapsulates the encapsulated image adjustment parameter, and obtains the image adjustment parameter.

That is, the first system may encapsulate the image adjustment parameter through the protocol stack or the encoder. Correspondingly, the second system may decapsulate the image adjustment parameter through the protocol stack or the encoder, so as to obtain the image adjustment parameter. For encapsulation of the image adjustment parameter, reference may be made to the foregoing embodiment shown in FIG. 4, which, for simplicity, is not repeatedly described herein.

It should be understood that, in the embodiment of the present invention, image adjustment parameters of all first systems may be stored in a memory of the second system, and for example, a parameter table is established, to respectively indicate image adjustment parameters of different first systems. For example, parameters of all systems may be stored in a multipoint control unit (Multipoint Control Unit, "MCU" for short). Therefore, when a reconnection is needed or a connection needs to be performed again, the second system may directly perform table lookup instead of transmission of a parameter; especially when a protocol stack method is used, the foregoing message may not be exchanged when reconnection or re-accessing a conference site is performed, that is, the foregoing packet may not be transmitted, and in this case, the image adjustment parameter cannot be exchanged again.

It should be further understood that, in the embodiment of the present invention, the first system sending the image adjustment parameter may first interact with the second system receiving the image adjustment parameter, so as to determine whether the second system supports and identifies the image adjustment parameter. If the second system supports and identifies the image adjustment parameter, the first system may operate according to the foregoing solution; if the second system cannot support and identify the image adjustment parameter, the first system may directly send the image that is adjusted. If the first system does not support the image adjustment parameter, but the second system supports the image adjustment parameter, the second system may perform processing according to its own choice. For example, the second system may perform no operation on the image that is sent, and may also perform a corresponding operation according to a parameter of the second system and a default rule.

Therefore, according to the method for transmitting information in the embodiment of the present invention, an image adjustment parameter which is sent by a first system and indicates shooting width information in a form of spatial information is obtained, so that a second system can adjust an image according to the image adjustment parameter, thereby effectively obtaining and transmitting information used for image adjustment, improving user experience, and enhancing product competitiveness.

In the foregoing, with reference to FIG. 1 to FIG. 6, the method for transmitting information according to the embodiments of the present invention is described in detail. In the following, with reference to FIG. 7 to FIG. 13, a terminal for transmitting information according to an embodiment of the present invention is described in detail.

Figure 7:
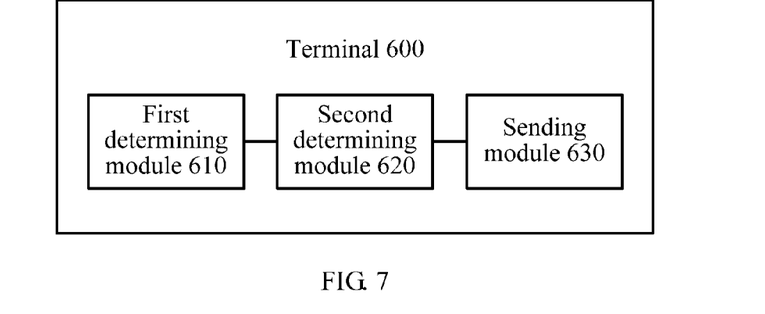
FIG. 7 is a schematic block diagram of a terminal for transmitting information according to an embodiment of the present invention.

FIG. 7 is a schematic block diagram of a terminal 600 for transmitting information according to an embodiment of the present invention. As shown in FIG. 7, the terminal 600 includes:

a first determining module 610, configured to determine shooting width information of a first system including the terminal;

a second determining module 620, configured to determine an image adjustment parameter according to the shooting width information determined by the first determining module 610, where the image adjustment parameter is used to indicate the shooting width information in a form of spatial information; and a sending module 630, configured to send, to a second system, the image adjustment parameter determined by the second determining module 620, so that the second system adjusts a received or captured image according to the image adjustment parameter.

Therefore, according to the terminal for transmitting information in the embodiment of the present invention, an image adjustment parameter indicating shooting width information in a form of spatial information is sent to a second system, so that the second system can adjust an image according to the image adjustment parameter, thereby effectively obtaining and transmitting information used for image adjustment, improving user experience, and enhancing product competitiveness.

In the embodiment of the present invention, optionally, the shooting width information determined by the first determining module 610 includes first width information of adjacent shooting areas of the first system, or second width information of a blind area between the adjacent shooting areas.

Figure 8A:
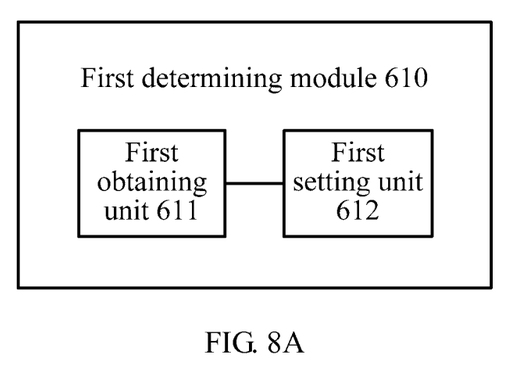
FIG. 8A to FIG. 8C are schematic block diagrams of a first determining module according to an embodiment of the present invention.

In the embodiment of the present invention, optionally, as shown in FIG. 8A, the first determining module 610 includes:

a first obtaining unit 611, configured to obtain a border width of a display device of the first system; and a first setting unit 612, configured to set the second width information to twice of the border width obtained by the first obtaining unit 611.

Figure 8B:
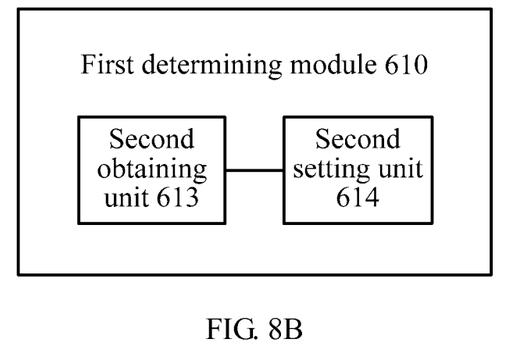

In the embodiment of the present invention, optionally, as shown in FIG. 8B, the first determining module 610 includes:

a second obtaining unit 613, configured to obtain a horizontal distance between adjacent images captured by the first system; and a second setting unit 614, configured to set the second width information to the horizontal distance obtained by the second obtaining unit 613.

Figure 8C:
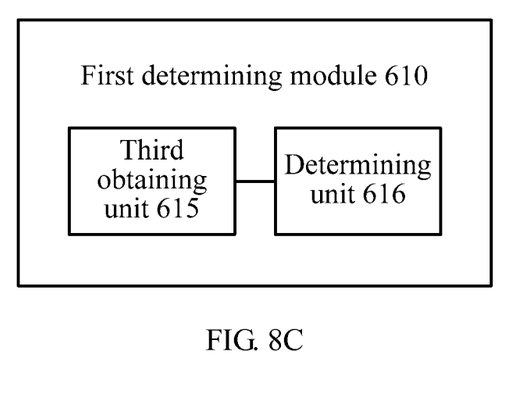

In the embodiment of the present invention, optionally, as shown in FIG. 8C, the first determining module 610 includes:

a third obtaining unit 615, configured to obtain a total width L of shooting areas, a width M of a single shooting area, and the number N of the shooting areas of the first system; and a determining unit 616, configured to determine the second width information D according to the width L, the width M, and the number N obtained by the third obtaining unit 615, where the second width information D is determined according to the following equation: $D=(L-M\cdot N)/(N-1)$.

Figure 8D:
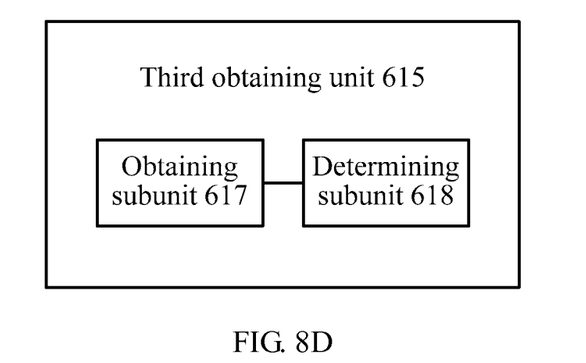
FIG. 8D is a schematic block diagram of a third obtaining unit according to an embodiment of the present invention.

In the embodiment of the present invention, optionally, as shown in FIG. 8D, the third obtaining unit 615 includes:

an obtaining subunit 617, configured to obtain a horizontal shooting angle A of the first system, and a vertical distance H between the first system and a shooting scene; and a determining subunit 618, configured to determine the width M of the single shooting area according to the horizontal shooting angle A and the vertical distance H obtained by the obtaining subunit 617, where the width M of the single shooting area is determined according to the following equation: $M=2\tan(A/2)\cdot H$.

Optionally, the second determining module 620 is further configured to determine the image adjustment parameter according to the shooting width information and location information of the first system, where the image adjustment parameter includes first spatial information of adjacent shooting areas of the first system, or second spatial information of a blind area between the adjacent shooting areas.

Figure 9:
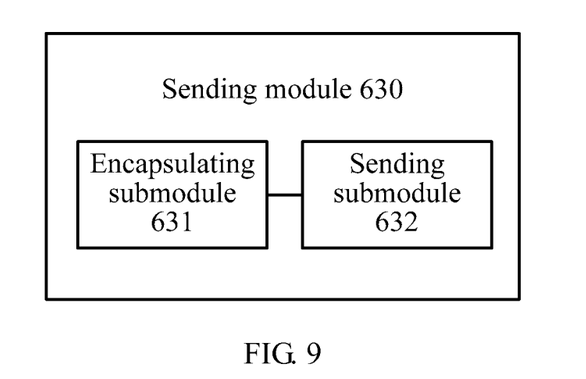
FIG. 9 is a schematic block diagram of a sending module according to an embodiment of the present invention.

Optionally, as shown in FIG. 9, the sending module 630 includes:

an encapsulating submodule 631, configured to encapsulate the image adjustment parameter through a protocol stack or an encoder; and a sending submodule 632, configured to send, to the second system, the image adjustment parameter encapsulated by the encapsulating submodule.

In the embodiment of the present invention, optionally, the terminal is a multipoint control unit. It should be understood that, the first system or the second system may also be a multipoint control unit.

It should be understood that, in the embodiment of the present invention, the first system may include the terminal 600. It should be further understood that, the terminal 600 for transmitting information according to the embodiment of the present invention may correspond to the first system in the method according to the embodiment of the present invention, and the foregoing and other operations and/or functions of the modules in the terminal 600 are respectively intended to implement corresponding procedures of the method 100 to method 300 in FIG. 1 to FIG. 4, which, for simplicity, are not repeatedly described herein.

Therefore, according to the terminal for transmitting information in the embodiment of the present invention, an image adjustment parameter indicating shooting width information in a form of spatial information is sent to a second system, so that the second system can adjust an image according to the image adjustment parameter, thereby effectively obtaining and transmitting information used for image adjustment, improving user experience, and enhancing product competitiveness.

Figure 10:
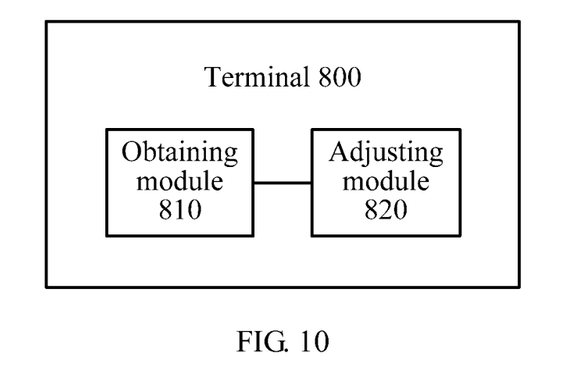
FIG. 10 is a schematic block diagram of a terminal for transmitting information according to another embodiment of the present invention.

FIG. 10 is a schematic block diagram of a terminal 800 for transmitting information according to another embodiment of the present invention. As shown in FIG. 10, the terminal 800 may include:

an obtaining module 810, configured to obtain an image adjustment parameter sent by a first system, where the image adjustment parameter is used to indicate shooting width information of the first system in a form of spatial information; and an adjusting module 820, configured to adjust a received or captured image according to the image adjustment parameter obtained by the obtaining module 810.

Therefore, according to the terminal for transmitting information in the embodiment of the present invention, an image adjustment parameter which is sent by a first system and indicates shooting width information in a form of spatial information is obtained, so that the terminal can adjust an image according to the image adjustment parameter, thereby effectively obtaining and transmitting information used for image adjustment, improving user experience, and enhancing product competitiveness.

Figure 11:
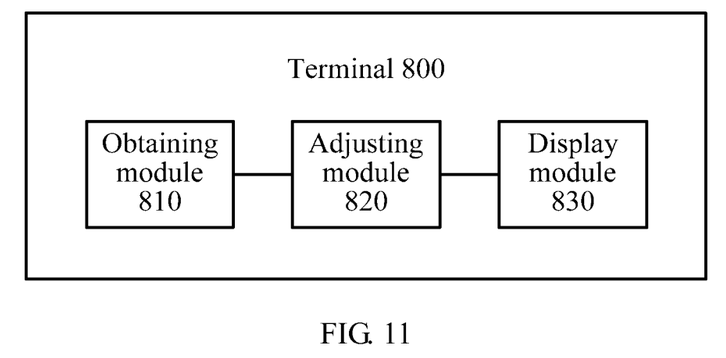
FIG. 11 is another schematic block diagram of a terminal for transmitting information according to another embodiment of the present invention.

In the embodiment of the present invention, optionally, as shown in FIG. 11, the terminal 800 further includes:

a display module 830, configured to display the image that is adjusted by the adjusting module 820.

Figure 12:
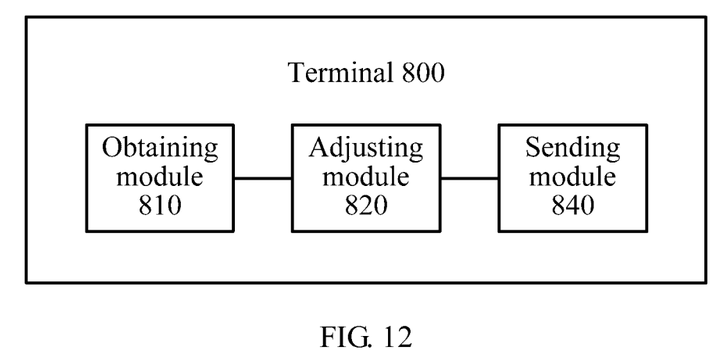
FIG. 12 is still another schematic block diagram of a terminal for transmitting information according to another embodiment of the present invention.

In the embodiment of the present invention, optionally, as shown in FIG. 12, the terminal 800 further includes:

a sending module 840, configured to send, to the first system, the image that is adjusted by the adjusting module 820, so that the first system displays the image.

In the embodiment of the present invention, optionally, the image adjustment parameter obtained by the obtaining module 810 includes first spatial information of adjacent shooting areas of the first system, or second spatial information of a blind area between the adjacent shooting areas.

Figure 13:
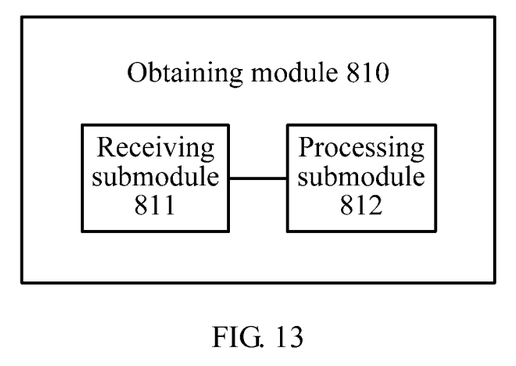
FIG. 13 is a schematic block diagram of an obtaining module according to another embodiment of the present invention.

In the embodiment of the present invention, optionally, as shown in FIG. 13, the obtaining module 810 includes:

a receiving submodule 811, configured to receive the image adjustment parameter sent by the first system and encapsulated through a protocol stack or an encoder; and a processing submodule 812, configured to decapsulate the encapsulated image adjustment parameter received by the receiving submodule 811, and obtain the image adjustment parameter.

In the embodiment of the present invention, optionally, the terminal is a multipoint control unit. It should be understood that, the first system or the second system is also a multipoint control unit.

It should be understood that, in the embodiment of the present invention, the second system may include the terminal 800. It should be further understood that, the terminal 800 for transmitting information according to the embodiment of the present invention may correspond to the second system in the method according to the embodiment of the present invention, and the foregoing and other operations and/or functions of the modules in the terminal 800 are respectively intended to implement corresponding procedures of the method 400 to method 500 in FIG. 5 to FIG. 6, which, for simplicity, are not repeatedly described herein.

It should be further understood that, the terminal for transmitting information according to the embodiment of the present invention may include the modules in the terminal 600, and may also simultaneously include the modules in the terminal 800, but the present invention is not limited thereto.

Therefore, according to the terminal for transmitting information in the embodiment of the present invention, an image adjustment parameter which is sent by a first system and indicates shooting width information in a form of spatial information is obtained, so that the terminal can adjust an image according to the image adjustment parameter, thereby effectively obtaining and transmitting information used for image adjustment, improving user experience, and enhancing product competitiveness.

A person of ordinary skill in the art may realize that, units and algorithm steps of each example described with reference to the embodiments disclosed herein can be implemented by electronic hardware, computer software, or a combination of the two. In order to clearly describe interchangeability between the hardware and the software, compositions and steps of each example have been generally described according to functions in the foregoing descriptions. Whether these functions are executed in a hardware or software manner depends on particular application and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus and unit, reference may be made to the corresponding process in the foregoing method embodiments, and details are not repeatedly described herein.

In several embodiments provided in the present application, it should be understood that the disclosed system, apparatus, and method may be implemented in other manners. For example, the foregoing described apparatus embodiments are merely exemplary. For example, dividing of the units is merely a kind of logical function dividing, and there may be other dividing manners in actual implementation. For example, multiple units or components may be combined or integrated into another system, or some features may be ignored or not performed. In addition, the shown or discussed mutual coupling or direct coupling or communication connection may be implemented through some interfaces, and indirect coupling or communications between apparatuses or units may also be electrical, mechanical or in other forms.

Units described as separate components may be or may not be physically separated. Components shown as units may be or may not be physical units, that is, may be located in one place or may be distributed to a plurality of network units. Some or all of the units may be selected according to actual demands to achieve the objectives of the solutions of the embodiments.

In addition, various functional units according to each embodiment of the present invention may be integrated in one processing unit, or each unit may also exist alone physically, or two or more units may also be integrated in one unit. The integrated unit may be implemented in a hardware manner, or may also be implemented in a form of a software functional module.

When the integrated unit is implemented in the form of the software functional unit and sold or used as a separate product, the integrated unit may be stored in a computer readable storage medium. Based on such understanding, the technical solutions of the present invention or the part that makes contributions to the prior art or all or part of the technical solutions may be substantially embodied in a form of a software product. The computer software product is stored in a storage medium, and includes several instructions to instruct a computer device (which may be a personal computer, a server, or a network device, or the like) to perform all or a part of steps of the method as described in the embodiments of the present invention. The foregoing storage medium includes various media capable of storing program code, such as, a USB flash drive, a removable hard disk, a read-only memory (ROM, Read-Only Memory), a random access memory (RAM, Random Access Memory), a magnetic disk or an optical disc.

The foregoing descriptions are merely specific implementation manners of the present invention, but not intended to limit the protection scope of the present invention. Any person skilled in the art may easily figure out various equivalent modifications or replacements within the technical scope disclosed by the present invention, and these modifications or replacements shall fall within the protection scope of the present invention. Therefore, the protection scope of the present invention is subject to the protection scope of the appended claims.

What is claimed is:

1. A method for adjusting image of a video conference system, comprising:
   obtaining, by a second video conference system, an image adjustment parameter from a first video conference system;
   wherein the image adjustment parameter comprises a first spatial information of adjacent shooting areas of the first video conference system and the image adjustment parameter is used to indicate sizes of shooting areas of the first video conference system and a spatial relationship between the shooting areas,
   or, wherein the image adjustment parameter comprises a second spatial information of a blind area between the adjacent shooting areas and the image adjustment parameter is used to indicate size and location of the blind area,
   adjusting, by the second video conference system, a received or captured image according to the image adjustment parameter.

2. The method according to claim 1, wherein the image adjustment parameter is a logical parameter, and wherein the image adjustment parameter is a proportion of each shooting area of the first video conference system to a whole conference site, or, the image adjustment parameter is a proportion of each blind area of the first video conference system to a whole conference site.

3. The method according to claim 1, wherein the image adjustment parameter is a physical parameter, the image adjustment parameter indicates the first spatial information or the second spatial information by using a length unit or angle unit.

4. The method according to claim 1, wherein the obtaining an image adjustment parameter from a first video conference system comprises:
   receiving the image adjustment parameter sent by the first video conference system and encapsulated through a protocol stack or an encoder; and
   decapsulating the encapsulated image adjustment parameter, and obtaining the image adjustment parameter.

5. The method according to claim 1, further comprising:
   displaying the image that is adjusted, or sending, to the first video conference system, the image that is adjusted, so that the first video conference system displays the image.

6. A method for transmitting information, comprising:
   determining, by a first video conference system, an image adjustment parameter,
   wherein the image adjustment parameter comprises a first spatial information of adjacent shooting areas of the first video conference system and the image adjustment parameter is used to indicate sizes of shooting areas of the first video conference system and a spatial relationship between the shooting areas,
   or, wherein the image adjustment parameter comprises a second spatial information of a blind area between the adjacent shooting areas and the image adjustment parameter is used to indicate size and location of the blind area;
   sending, by the first video conference system, the image adjustment parameter to a second video conference system, so that the second video conference system adjusts a received or captured image according to the image adjustment parameter.

7. The method according to claim 6, wherein the image adjustment parameter is a logical parameter, and wherein the image adjustment parameter is a proportion of each shooting area of the first video conference system to a whole conference site, or, the image adjustment parameter is a proportion of each blind area of the first video conference system to a whole conference site.

8. The method according to claim 6, wherein the image adjustment parameter is a physical parameter, the image adjustment parameter indicates the first spatial information or the second spatial information by using a length unit or angle unit.

9. The method according to claim 6, wherein the image adjustment parameter is determined by the first video conference system according to shooting width information and location information.

10. The method according to claim 9, wherein the shooting width information comprises first width information of adjacent shooting areas of the first video conference system, or second width information of a blind area between the adjacent shooting areas.

11. The method according to claim 9, wherein before the determining step the method further comprising:
determining, by a first video conference system, the shooting width information and location information of the first video conference system.

12. The method according to claim 11, wherein the determining shooting width information of a first video conference system comprises:
obtaining a total width L of shooting areas, a width M of a single shooting area, and the number N of the shooting areas of the first video conference system; and
determining the second width information D according to the width L, the width M, and the number N, wherein the second width information D is determined according to the following equation:

$D=(L-M \cdot N)/(N-1)$.

13. The method according to claim 12, wherein the obtaining a width M of a single shooting area comprises:
obtaining a horizontal shooting angle A of the first video conference system, and a vertical distance H between the first video conference system and a shooting scene; and
determining the width M of the single shooting area according to the horizontal shooting angle A and the vertical distance H, wherein the width M of the single shooting area is determined according to the following equation:

$M=2 \tan(A/2) \cdot H$.

14. The method according to claim 6, wherein the sending the image adjustment parameter to a second video conference system comprises:
encapsulating the image adjustment parameter through a protocol stack or an encoder; and
sending the encapsulated image adjustment parameter to the second video conference system.

15. A terminal for adjusting image of a video conference system, comprising:
an obtaining module, configured to obtain an image adjustment parameter from a first video conference system;
wherein the image adjustment parameter comprises a first spatial information of adjacent shooting areas of the first video conference system and the image adjustment parameter is used to indicate sizes of shooting areas of the first video conference system and a spatial relationship between the shooting areas,
or, wherein the image adjustment parameter comprises a second spatial information of a blind area between the adjacent shooting areas and the image adjustment parameter is used to indicate size and location of the blind area; and
an adjusting module, configured to adjust a received or captured image according to the image adjustment parameter obtained by the obtaining module.

16. The terminal according to claim 15, further comprising:
a sending module, configured to send, to the first video conference system, the image that is adjusted by the adjusting module, so that the first video conference system displays the image.

17. A terminal for adjusting image of a video conference system, comprising:
a determining module, configured to determine an image adjustment parameter;
wherein the image adjustment parameter comprises a first spatial information of adjacent shooting areas of the first video conference system and the image adjustment parameter is used to indicate sizes of shooting areas of the first video conference system and a spatial relationship between the shooting areas; or, wherein the image adjustment parameter comprises a second spatial information of a blind area between the adjacent shooting areas and the image adjustment parameter is used to indicate size and location of the blind area; and
a sending module, configured to send the image adjustment parameter to a second video conference system, so that the second video conference system adjusts a received or captured image according to the image adjustment parameter.

18. The terminal according to claim 17, wherein the image adjustment parameter is determined according to shooting width information and location information; and
the determining module, further configured to determine the shooting width information and location information of the first video conference system.

19. A telepresence system, comprising:
a first video conference system, configured to determine an image adjustment parameter and to send the image adjustment parameter to a second video conference system; and
the second video conference system, configured to obtain the image adjustment parameter from the first video conference system and to adjust a received or captured image according to the image adjustment parameter;
wherein the image adjustment parameter comprises a first spatial information of adjacent shooting areas of the first video conference system and the image adjustment parameter is used to indicate sizes of shooting areas of the first video conference system and a spatial relationship between the shooting areas; or, wherein the image adjustment parameter comprises a second spatial information of a blind area between the adjacent shooting areas and the image adjustment parameter is used to indicate size and location of the blind area.

20. The system according to claim 19, wherein the image adjustment parameter is a logical parameter, and wherein the image adjustment parameter is a proportion of each shooting area of the first video conference system to a whole conference site, or, the image adjustment parameter is a proportion of each blind area of the first video conference system to a whole conference site;

or, wherein the image adjustment parameter is a physical parameter, the image adjustment parameter indicates the first spatial information or the second spatial information by using a length unit or angle unit.

* * * * *